(12) United States Patent
Rossholm et al.

(10) Patent No.: US 9,462,233 B2
(45) Date of Patent: Oct. 4, 2016

(54) METHODS OF AND ARRANGEMENTS FOR PROCESSING AN ENCODED BIT STREAM

(75) Inventors: Andreas Rossholm, Malmö (SE); Martin Pettersson, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1077 days.

(21) Appl. No.: 13/201,619

(22) PCT Filed: Mar. 13, 2009

(86) PCT No.: PCT/SE2009/050262
§ 371 (c)(1),
(2), (4) Date: Aug. 15, 2011

(87) PCT Pub. No.: WO2010/104432
PCT Pub. Date: Sep. 16, 2010

(65) Prior Publication Data
US 2011/0299593 A1  Dec. 8, 2011

(51) Int. Cl.
*H04N 7/173* (2011.01)
*H04N 21/235* (2011.01)
*H04N 21/44* (2011.01)
(Continued)

(52) U.S. Cl.
CPC ........ *H04N 7/17318* (2013.01); *H04N 19/127* (2014.11); *H04N 19/139* (2014.11); *H04N 19/14* (2014.11); *H04N 19/159* (2014.11); *H04N 19/42* (2014.11); *H04N 19/44* (2014.11); *H04N 19/46* (2014.11); *H04N 19/523* (2014.11); *H04N 19/573* (2014.11); *H04N 19/61* (2014.11);
(Continued)

(58) Field of Classification Search
USPC .......................... 375/240.02, 240.03, 240.25
See application file for complete search history.

(56) References Cited

U.S. PATENT DOCUMENTS 6,542,549 B1 * 4/2003 Tan et al. ................. 375/240.26
2002/0154227 A1 10/2002 Lan et al.
(Continued)

FOREIGN PATENT DOCUMENTS

CN  101043632 A  9/2007
CN  101356827 A  1/2009
(Continued)

OTHER PUBLICATIONS

International Preliminary Report on Patentability, PCT International Application No. PCT/SE2009/050262, Mar. 13, 2009 (10 pages).
(Continued)

*Primary Examiner* — Christopher S Kelley
*Assistant Examiner* — Zhihan Zhou
(74) *Attorney, Agent, or Firm* — Myers Bigel & Sibley, P.A.

(57) ABSTRACT

In a method for extracting information from an encoded bit stream, the extracted information may be used for improving bit stream quality assessment, or for adapting a decoding sub-system. From an encoded bit stream, received from a bit stream source, complexity related information that is indicative of the complexity of the encoding of said bit stream is extracted. On the basis of said extracted complexity related information one or more data settings are then selected, after which the data settings may be used as an input for improving bit stream quality assessment at a decoding device or a network node, or for adapting a bit stream decoding sub-system at a decoding device.

9 Claims, 6 Drawing Sheets

(51) Int. Cl.

| | | |
|---|---|---|
| *H04N 21/647* | (2011.01) | |
| *H04N 19/139* | (2014.01) | |
| *H04N 19/159* | (2014.01) | |
| *H04N 19/46* | (2014.01) | |
| *H04N 19/61* | (2014.01) | |
| *H04N 19/127* | (2014.01) | |
| *H04N 19/14* | (2014.01) | |
| *H04N 19/44* | (2014.01) | |
| *H04N 19/42* | (2014.01) | |
| *H04N 19/523* | (2014.01) | |
| *H04N 19/573* | (2014.01) | |

(52) U.S. Cl.
CPC .... *H04N21/2353* (2013.01); *H04N 21/44004* (2013.01); *H04N 21/64784* (2013.01)

(56) References Cited

U.S. PATENT DOCUMENTS

| | | | |
|---|---|---|---|
| 2003/0026497 A1* | 2/2003 | Ali | 382/278 |
| 2004/0156438 A1* | 8/2004 | Choi | 375/240.25 |
| 2004/0234142 A1* | 11/2004 | Chang et al. | 382/236 |
| 2007/0071332 A1 | 3/2007 | Katayama | |
| 2007/0133690 A1* | 6/2007 | Xin et al. | 375/240.24 |
| 2010/0135389 A1 | 6/2010 | Tanizawa et al. | |

FOREIGN PATENT DOCUMENTS

| | | | |
|---|---|---|---|
| EP | 0 910 219 A2 | | 4/1999 |
| JP | 2004-527960 A | | 9/2004 |
| JP | 2007-514330 A | | 5/2007 |
| WO | WO 9917552 A1 | * | 4/1999 |
| WO | WO 2004/054274 A1 | | 6/2004 |
| WO | WO 2005/043919 A1 | | 5/2005 |
| WO | WO 2006/092671 A1 | | 9/2006 |
| WO | WO 2006092671 A1 | * | 9/2006 |
| WO | WO 2008/094092 A1 | | 8/2008 |
| WO | WO 2009/001793 A1 | | 12/2008 |

OTHER PUBLICATIONS

International Search Report, PCT Application No. PCT/SE2009/050262, Mar. 13, 2009 (5 pages).

Written Opinion of the International Searching Authority, PCT Application No. PCT/SE2009/050262, Mar. 13, 2009 (9 pages).

Yingwei C., et al. "Regulated complexity scalable MPEG-2 video decoding for media processors," IEEE Transactions on Circuits and Systems for Video Technology, vol. 12, No. 8, pp. 678-687, Aug. 2002.

Japanese Office Action Corresponding to Japanese Patent Application No. 2011-553978; Mailing Date: Apr. 15, 2013; 2 pages (Foreign Text Only).

Japanese Office Action Corresponding to Japanese Patent Application No. 2011-553978; Mailing Date: Jan. 7, 2013; 2 Pages (Foreign Text Only).

Extended European Search Report, EP Application No. 09841595.3, Dec. 11, 2013.

"Text of ISO/IEC 14496-10 FCD Advanced Video Coding," 61, MPEG Meeting, Jul. 2002, Klagenfurt, Motion Pictureexpert Group of ISO/IEC JTC1/SC29/WG11, No. N4920, Aug. 11, 2002.

Puri et al., "Video coding using the H.264/MPEG-4 AVC compression standard," Signal Processing, Image Communication, Elsevier Science Publishers, Amsterdam, NL, vol. 19, No. 9, Oct. 1, 2004, pp. 793-849.

Japanese Notice of Ground for Rejection Corresponding to Japanese Patent Application No. 2013-253554; Mailing Date: Nov. 17, 2014; 2 Pages.

Chinese Second Office Action Corresponding to Chinese Patent Application No. 200980158018.1; Issuing Date: Dec. 24, 2014; 9 Pages.

Chinese First Office Action Corresponding to Chinese Patent Application No. 200980158018.1; Issuing Date: Jun. 3, 2014; 2 Pages.

* cited by examiner

METHODS OF AND ARRANGEMENTS FOR PROCESSING AN ENCODED BIT STREAM

CROSS REFERENCE TO RELATED APPLICATION

This application is a 35 U.S.C. §371 national stage application of PCT International Application No. PCT/SE2009/050262, filed on 13 Mar. 2009, the disclosure and content of which is incorporated by reference herein in its entirety. The above-referenced PCT International Application was published in the English language as International Publication No. WO 2010/104432 A1 on 16 Sep. 2010.

TECHNICAL FIELD

The present document relates to methods of, and arrangements for, processing an encoded bit stream while taking the complexity of the preceding encoding process into consideration.

BACKGROUND

With the emergence of new communication technologies, multimedia services, such as e.g. Multimedia streaming, are becoming more popular to a large extent due to improved coverage and quality for media content, such as e.g. video, that may be distributed to various types of user devices, including both stationary, as well as mobile, user devices.

To ensure good quality of experience for such a media service, telecommunication system operators for both wireless and wired networks normally use tools and measurements to locate and prevent problems of a network or service, already close to the source.

With a tool that is adapted to recognize significant characteristics of the media content, the result of such an analysis can also be used for optimizing the network, thereby enabling more users to have a user experience of an adequate quality for the services offered, given certain network resources that are available to a service provider.

Some services only require that a few network parameters, such as e.g. the throughput, be measured to give a good estimate of the quality for the end user. When it comes to multimedia services, such as e.g. video streaming, the task of measuring quality of experience is not just as trivial since there are several factors that may contribute to a degradation of the quality, including the media itself.

Video quality assessment is related to the human perception of video and can be divided into subjective and objective methods. While subjective test methods normally give the best results, they are also expensive and time consuming, as a number of test persons have to be used to grade each video sequence, before a Mean Opinion Score (MOS) can be calculated, if a reliable result is to be achieved. Objective models, which can be used for real-time quality assessment, are often designed to output a score that estimates subjective MOS.

Objective models can be divided into three categories, namely perceptual models, parametric models and bit-stream models.

Perceptual models often depend on a number of image analysis algorithms to emphasize and quantify artifacts in the video. Perceptual models are also often divided into full-reference (FR) models, reduced-reference (RR) models and no-reference (NR) models. Perceptual NR models only use a decoded video as input to the model, while FR models also use the associated, uncoded reference as processing input. Instead of using the full reference, RR models use information about the reference as input via a narrow side-channel.

A number of standards exist for perceptual models such as e.g. the ITU-T Rec. J-144, which refers to different FRTV Multimedia (MM) models, ITU-T Rec. J-246, which refers to RRMM models, while ITU-T Rec. J-247 refers to FRMM models. The performance of the NR perceptual models is however still too poor to have any models standardized.

Parametric models known from prior art, commonly use different network parameters and codec information as input to estimate a bit stream quality score. Although the performance of parametric models tend to be worse than that of FR perceptual models, parametric models generally have a low grade of complexity and do not need the computational power that is normally required by perceptual models. Parametric models can therefore easily be implemented both in network nodes, and in user equipment, such as e.g. set-top boxes (STBs) and mobile devices.

Video bit stream models use a compressed video bit stream as input when the quality of the bit stream is to be estimated. Bit stream models are somewhat more complex than parametric models since more data needs to be parsed. However, since information about the coding can be acquired, these types of models have the potential of providing an estimation of the video quality with better accuracy than what can be achieved with alternative models.

There are many new encoders available on the market today, such as e.g. Handbreak, Quicktime, and Helix. When bit streams from these encoders are analyzed it is observed that the setups of encoder features may differ, even if the same profile and level is used. The amount of encoder features enabled affects the computational power needed for the encoder, and as a consequence, the time it takes to encode a frame may differ from one setup to another. This also affects the amount of computational power needed on the decoder side and, thus, the encoder can chose to limit the amount of feature if it is known, or likely that there is some type of resource limitations, such as e.g. computational power limitations or memory limitations, on the decoder side.

By using different setups of coding features at the encoder, these setups may be seen as corresponding to different, respective complexity levels, where e.g. the splitting of macro blocks into smaller partitions, and resolutions of the motion vectors during motion estimation are typical features that will affect the computational power.

This type of features is normally used to decrease the residual in the encoder loop, as well as to create an opportunity to increase the quality of the encoded stream.

The U.S. Pat. No. 6,011,868 describes a method for analyzing the quality of a video bit stream by using information about quantization and DCT coefficients.

It is also commonly known to use transport and video stream parameters to calculate a bit stream quality score, as well as to base the calculations on data, such as e.g. motion vector information and intra/inter-predicted frame/slice ratios, i.e. information that relates to the actual bit stream, given a certain encoding.

Conference paper "Proposal of a new QoE assessment approach for quality management of IPTV services", ICIP 2008, presents an IPTV bit stream model that rely only on a quantization parameter (QP) when a bit stream quality score is calculated.

A common problem with the prior art bit stream quality model solutions are that although the complexity of the encoding procedure may differ from one case to another, this will not reflect the processing of the bit stream quality model selected for obtaining a bit stream quality score. Consequently, a bit stream quality model that is optimized for a specific encoder complexity will be used with the same data settings for different scenarios, involving encoders using different grades of complexity.

As a consequence from this, the accuracy of a resulting bit stream quality score may vary between measures, even though the same data settings are used as input for the used bit stream quality model.

Therefore, there is a need for a method and arrangement that enables an improved bit stream quality assessment.

SUMMARY

The object of the present invention is to overcome at least some of the drawbacks of the prior art mentioned above by way of improved methods and arrangements.

According to one aspect, a method for improving bit stream quality assessment in a multimedia system is provided, wherein a bit stream quality score is calculated on the basis of complexity related information that has been extracted from an encoded bit stream, typically a video bit stream, received from a bit stream source, and that is indicative of the complexity of the preceding encoding at the bit stream source.

The complexity related information is used for selecting one or more data settings, which are then used as an input to a bit stream quality model for calculating a bit stream quality score.

By basing the bit stream quality score calculation on information that is indicative of the complexity of the encoding, the accuracy of the resulting bit stream quality score will be improved compared to prior art solutions, due to the possibilities of efficient adaptation of the bit stream quality model.

According to another, alternative aspect, extracted complexity related information may instead be used for adapting a decoding sub-system, such that improved performance may be obtained. Such an adaptation may comprise adaption of e.g. the distribution of computational power, or the allocation of memory within the decoding sub-system.

By considering the complexity of the encoding, this information may be valuable for adapting certain sub-modules of the decoding subsystem, accordingly.

Any of the suggested methods may also be used on the basis of extracted complexity related information, in combination with additional quality related information.

The complexity related information may comprise complexity related parameters that are indicative e.g. of any of: macro block partition size; motion vector resolution; skipped macro blocks, or the number of used reference pictures, of a part of an encoded bit stream.

The extracted complexity related information, alone or in combination with other information, may be used for selecting appropriate data settings either directly, or indirectly, wherein a complexity level is first selected. In the latter case the bit stream quality score, or the adaptation of the decoding sub-system is then executed on the basis of the selected complexity level.

The claimed invention also relates to respective arrangements that are configured to execute any of the suggested methods.

Such arrangements may be implemented e.g. in any of a cellular telephone, a set-top box, a PC, a laptop, or a network node.

BRIEF DESCRIPTION OF THE DRAWINGS

The present invention will now be described in more detail by means of exemplary embodiments and with reference to the accompanying drawings, in which.

DETAILED DESCRIPTION

When a bit stream quality score is to be predicted for an encoded multimedia bit stream, carrying multimedia content, such as e.g. video, the use of input data provided to a bit stream quality model is essential for how good accuracy that can be achieved for bit stream quality score. In addition, for a multimedia decoding device, especially a mobile video decoding device, there is often a need for a number of co-processors or accelerations blocks to be able to handle complex bit streams accordingly. Such co-processors and/or acceleration blocks are also often configured to be turned on and off whenever required. More specifically, since such sub-systems can be more or less power consuming it is not desirable to have them running if it is not absolutely necessary. Moreover, the allocation of memory resources for the bit stream decoding process in a decoding device often tends to be based on the signaled profile and level used by each respective codec.

What is required is therefore an improved method that enables analyzing of bit stream encoding characteristics, wherein details regarding how the encoding of the bit stream has been executed as to the chosen level of complexity are taken into consideration. With such a mechanism at hand, at least some of the different issues mentioned above may be improved, resulting in an improved accuracy of a prediction of a bit stream quality model, or in an optimized usage of scarce resources at a decoding device. Consequently, a method is suggested where information that one way or the other is representative for the complexity of the encoding of a bit stream, i.e. which is indicative of the complexity that the encoder applied during encoding of an extracted bit stream, is used. The term indicative is in this context to be interpreted in its broadest sense, such that extracted information may comprise more or less detailed information, which, when processed may give a more or less detailed indication of the complexity that has been used by the encoder for encoding a bit stream.

The degree of complexity at the encoder may depend on the one or more parameters that is/are extracted from an encoded bit stream, as well as which rules that are applicable when the extracted information/parameters is being processed.

The suggested method is typically applicable for encoded video bit streams, but may be used also for corresponding processing of other types of encoded multimedia bit streams.

The suggested method is based on the fact that complexity related information is extracted and processed at a decoding and rendering device, or on a network node.

In order to obtain a bit stream quality score with better accuracy, a parameter extracting method is suggested which is based on one or more parameters that are indicative of the complexity of the encoding process, executed at a bit stream source.

According to the suggested method, one or more predefined parameters are extracted from an encoded bit stream, typically by parsing the encoded bit stream at a decoding device, or at a network node on which analysis of a received bit stream is required. Parsing may be executed according to any conventional procedure for parsing information from a bit stream, carrying multimedia content.

Once extracted, such parameters may be used, either alone, or in combination with other parameters, such as e.g. quality related parameters, that have been retrieved according to any prior art solution, so as to provide a bit stream quality score with improved accuracy.

Processing of encoded bit streams will typically result in special requirements for different parts of a decoding subsystem of a decoding device, such as e.g. co-processors and/or acceleration blocks. Since these sub-systems may be more or less power consuming, it is usually not desirable to keep them running unless absolutely necessary. With changing encoding complexity, there can therefore be a requirement for different parts of a decoding sub-system to be turned on and off depending on the demand. By making use of extracted complexity related information, such an adaptation, or optimization of the decoding sub-system, may be achieved.

In other words, the suggested method is using complexity related parameters, which are indicative of the encoder complexity used at a bit stream source, as an input for selecting appropriate data settings at a decoding device or network node. Such a data setting may then be used, either as an input to a bit stream quality model for obtaining a bit stream quality score with a good accuracy, or as an input for adapting a decoding sub-system.

The general principles on which the suggested method is based will now be described with reference to two flow charts of FIGS. 1a and 1b, respectively, which in general terms illustrates method steps to be executed in a decoding device 101 that receives and processes multimedia content in the form of an encoded bit stream, from a bit stream source 100, such as a terminal or a server, as well as steps to be executed at the corresponding bit stream source 100.

It is to be understood that all steps executed in the bit stream source 100 can be referred to as conventional steps, executing a conventional multimedia distribution method.

In case of a video bit stream, such a video distribution may be associated with a video streaming or a video telephony service, or any other service that enables distribution of compressed video. Such a service may be associate e.g. with any of mobile TV, such as e.g. MBMS or DVB-H, video conferencing, or digital broadcasted TV, such as e.g. DVB-T, DVB-C or DVB-S. The terminal to be used as a decoding device may be any of e.g. a mobile equipment, a video conferencing terminal, a set-top box (STB), or any other type of terminal that is configured to decode compressed video.

Figure 1A:
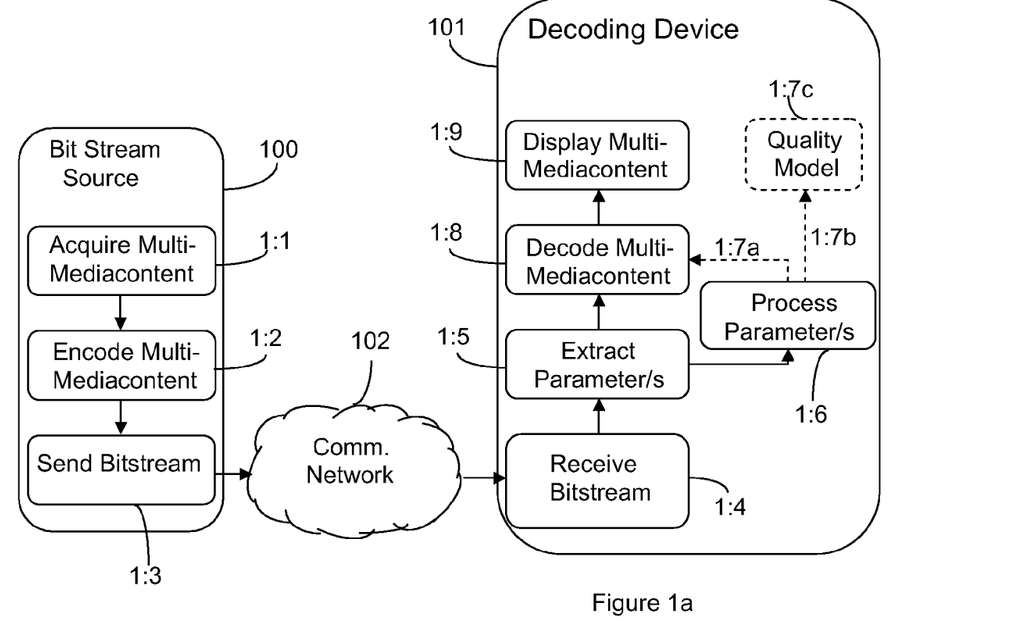
FIG. 1a is a schematic overview illustrating method steps of a decoding device, receiving an encoded bit stream from a bit stream source, and of the bit stream source, in two separate flow charts.

Although FIG. 1a shows method steps for two entities that are connected via a communications network 102, over which multimedia content, such as e.g. a compressed video, can be sent, it is to be understood that the parameter extraction mechanism suggested in this document is applicable also to scenarios where no network is present at all, and, thus, where instead a decoding device is receiving an encoded bit stream from a bit stream source that is integrated with, or directly connected to the decoding device, to which the encoded bit stream is provided.

In the simplified scenario of FIG. 1a a bit stream source 100, such as e.g. a sending terminal, or server, acquires video, or any other type of multimedia content from a bit stream source in a first step 1:1. The multimedia content is then encoded, using any type of conventional encoding techniques, as indicated in a next step 1:2, after which the encoded bit stream is sent to the decoding device 100 via network 102 (or provided directly to the decoding device 100, if no communication network is required), as indicated in a subsequent step 1:3.

Once received at the receiving terminal 100, as indicated with another step 1:4, encoding complexity related information, in the form of one or more predefined parameters are extracted from the video bit stream, typically by parsing the bit stream, as indicated with another step 1:5.

As indicated above, also additional parameters, such as e.g. other quality related parameters, may be extracted in addition to the complexity related ones.

In a subsequent step 1:6, the extracted parameters are processed, such that one or more data settings can be selected. The resulting data settings may then be used either during decoding of the bit stream, as indicated with the alternative path, indicated as an alternative step 1:7a, or as an input to a bit stream quality model, indicated with a step 1:7b, for calculation of a bit stream quality score, as indicated with another alternative step 1:7c.

In a next step 1:8 the bit stream is decoded, wherein the result from the parameter processing may be used according to any of the procedures, which will be described in more detail below. If, however, the aim of the parameter extracting procedure is to obtain a bit stream quality score, as indicated with steps 1:7b and 1:7c, the decoding step of step 1:8 may be executed in a conventional manner. In a final step 1:9 the encoded multimedia content can be displayed or presented to an end user.

According to another alternative scenario, the suggested parameter extraction mechanism may instead be applied, e.g. in a test unit of a network node, where a received encoded bit stream may be parsed, such that one or more required complexity related parameters can be extracted from the bit stream and used, e.g. for service or maintenance purposes.

Figure 1B:
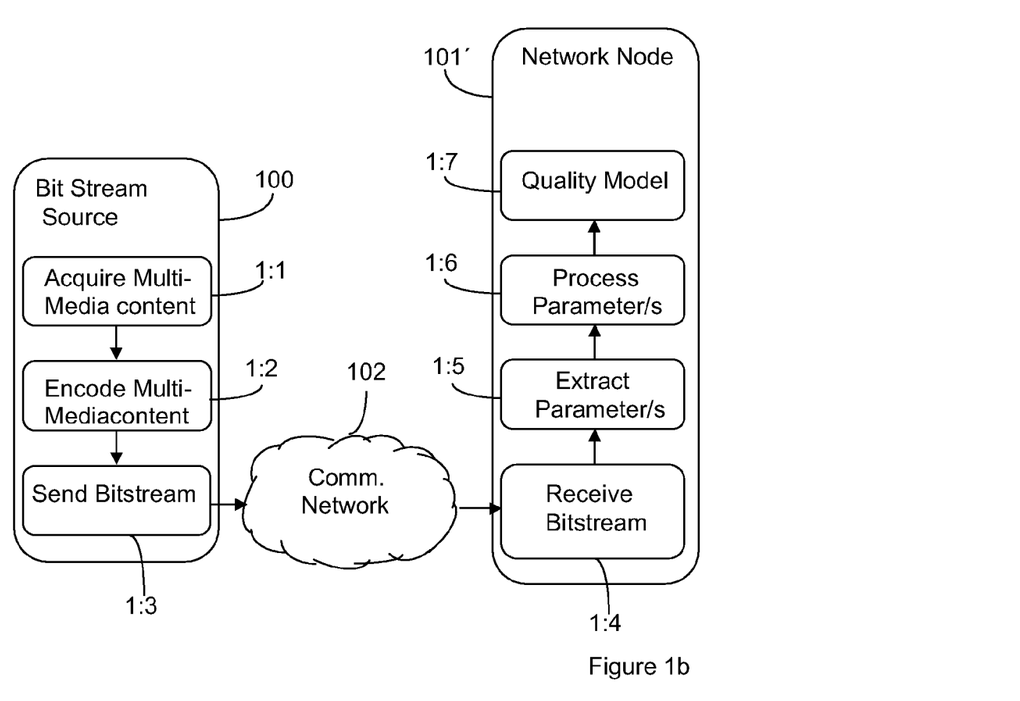
FIG. 1b is another schematic overview, illustrating the respective method steps in two flow charts, in a situation where an encoded bit stream is instead provided from a bit stream source, to a network node.

FIG. 1b is an illustration of such alternative method steps, where no rendering of the received multimedia content is executed. Such an embodiment may be applicable e.g. for a network node where a bit stream quality score is required. Such a network node typically also comprise conventional functionality which enables the network node to forward the bit stream accordingly, once the necessary information has been extracted.

Alternative ways of extracting complexity related information and of using the information retrieved as a result from the extracting procedure will now be described in further detail below.

Figure 2A:
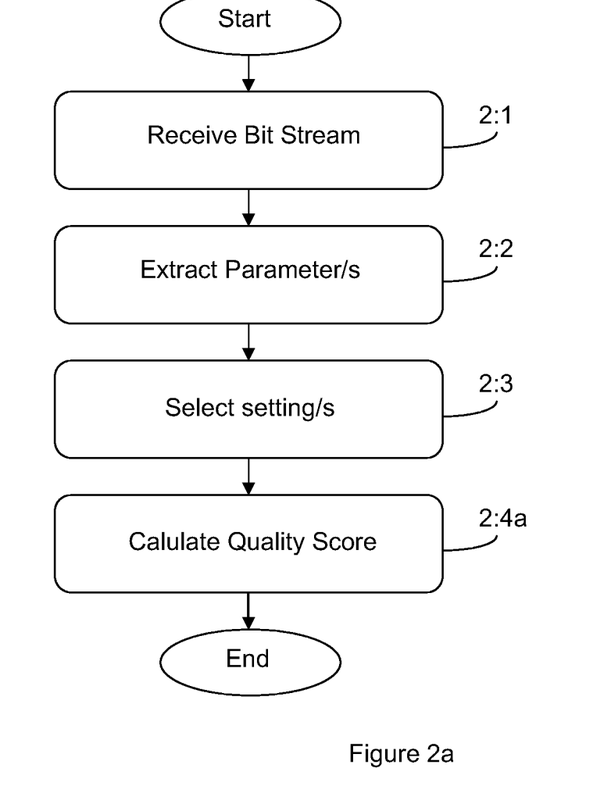
FIG. 2a is a flow chart illustrating a method for extracting, and using complexity related information, according to one embodiment.
Figure 2B:
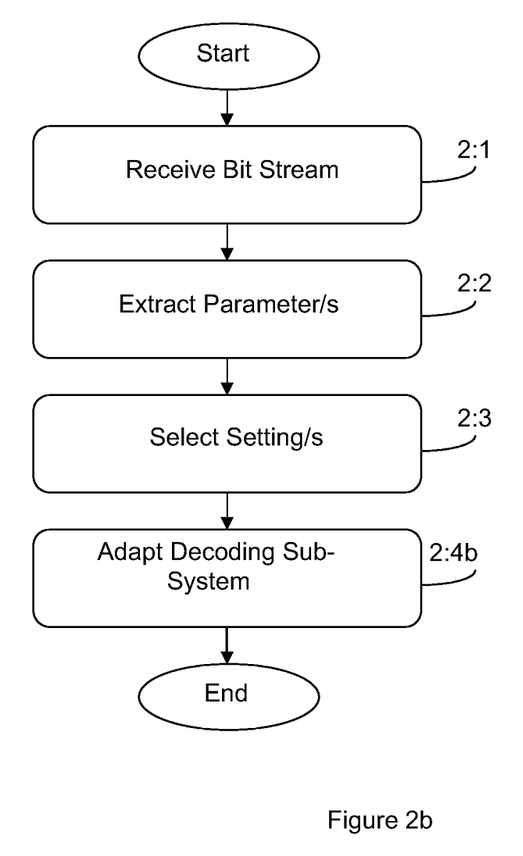
FIG. 2b is another flow chart illustrating a method for extracting and using complexity related information, according to another embodiment.

FIG. 2a is an illustration of a flow chart, where complexity related information is used for selecting data settings for a bit stream quality model, here exemplified with a video bit stream quality model to be used for estimating the quality of a video bit stream with good accuracy, while FIG. 2b is an illustration of another flow chart, showing how the result of the suggested parameter extracting mechanism may be used for adapting a decoding sub-system, so as to obtain a more efficient decoding procedure.

Both these alternative ways of using complexity related information, extracted from an encoded video bit stream may, directly or indirectly, be used for obtaining an improved performance for the video to be displayed, to end users of a multimedia system.

According to FIG. 2a, the video bit stream is received from a bit stream source in a first step 2:1.

In a next step 2:2, one or more parameters that are indicative of the complexity of the encoder are extracted from the video bit stream, typically as a result from parsing at least a part of a received encoded bit stream. The extracted parameter/s is/are then used as an input for selecting one or more data settings according to pre-defined rules, as indicated with another step 2:3.

As already indicated above, also additional parameters, such as e.g. a quantizer parameter, may have been extracted from the bit stream at step 2:2, and in such a case, one or more data settings are selected on the basis of a data input, comprising a combination of the extracted parameters.

According to one alternative embodiment, step 2:3 may be obtained by comparing the data input obtained in extracting step 2:2 to a set of pre-defined complexity levels, where a certain combination of parameter values may be interpreted as indicating encoding of a low complexity, and, thus, may result in a low complexity level being associated with the respective bit stream, while evaluation of another combination results in a low complexity level being associated with the encoding of the respective bit stream, while evaluation of another combination of parameters may result in the a selection of a complexity level which is representing a higher complexity of the encoding.

In a final step 2:4a the data settings are then used as an input for calculating a bit stream quality score, when using a certain video quality model.

As can be seen in FIG. 2b, steps 2:1-2:3 are identical to the first steps executed in FIG. 2a. However, instead of using the result of the information extraction for improving the accuracy when using a quality model for calculating a bit stream quality score for a video bit stream, the result may instead be used for obtaining a more efficient use of one or more specific category of limited resources in a decoding sub-system of the decoding device.

Basing such an adaptation or optimization procedure on information on the complexity of the encoding of the video bit stream, will typically result in a more efficient use of resources during decoding, without having to diminish the result of the decoding.

The complexity related information may comprise information that is indicative of different aspects of the encoding, such as e.g. the existence and the distribution of different intra-, or inter macro block partition sizes, skipped Macro Blocks (MBs), motion vector resolutions, or to information about the amount of reference pictures used during encoding of a video bit stream.

By way of example, one complexity related parameter that is to be extracted from a video bit stream by parsing said bit stream may e.g. be a parameter that is indicative of the percentage of a certain intra-, or inter partition size that has been used during encoding of a video bit stream, while another parameter may indicate e.g. the percentage of skipped MBs in a received video bit stream sequence.

H.264 defines three different intra partition sizes, denoted intra 16×16, intra 8×8 and intra 4×4, respectively. Which partitions to use for each MB in a video bit stream may be determined by the encoder, based on different issues, such as e.g. the number of bits to use for the encoding, the difficulty of encoding a current area with a required quality, and/or the time and processing power available to the encoder. For a low complex video sequence, an encoder may typically skip a larger amount of MBs without diminishing the visual quality of the video.

An encoder that is considered to represent an encoder with low complexity with processing constraints may also choose not to test all possible intra partitions, but limit the test associated with the encoding procedure as to which partitions to use during encoding to just some preferred partitions, with the result of a lower overall quality than what would have been the case in, what is considered as a more complex encoding procedure.

Figure 3A:
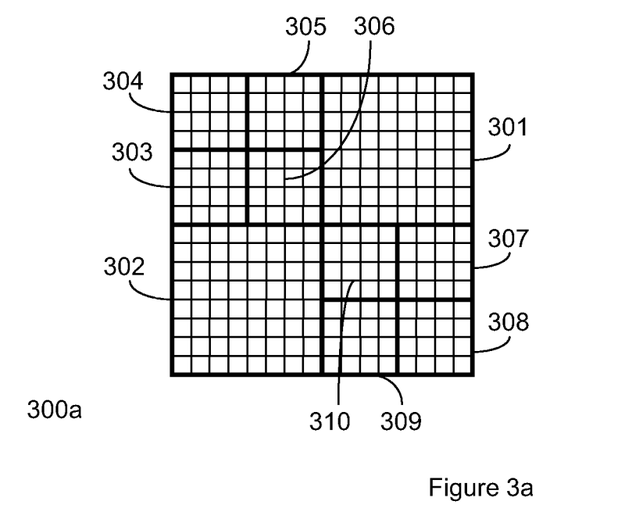
FIG. 3a is an illustration of a typical intra Macro Block that is divided into different intra partitions.

FIG. 3a is an illustration of a typical example of an intra MB 300a that has been divided into two diagonally located intra_8×8 partitions 301,302 and eight diagonally located intra_4×4 partitions 303-310. A typical reflection from the recent example may be that sections 303-306 and 307-310 of MB 300a comprise more changes, and, thus, require more encoding capacity than sections 301 and 302.

For inter MBs, H.264 defines seven different partition sizes, namely 16×16, 16×8, 8×16, 8×8, 8×4, 4×8 and 4×4. Analogous to intra MBs, the encoder has to determine which of these available inter MB partitions to use for the encoding procedure.

Also for inter MBs testing, all possible partitions is very processing consuming for the encoder, and may not even be doable at a relevant cost for low complex encoders.

Figure 3B:
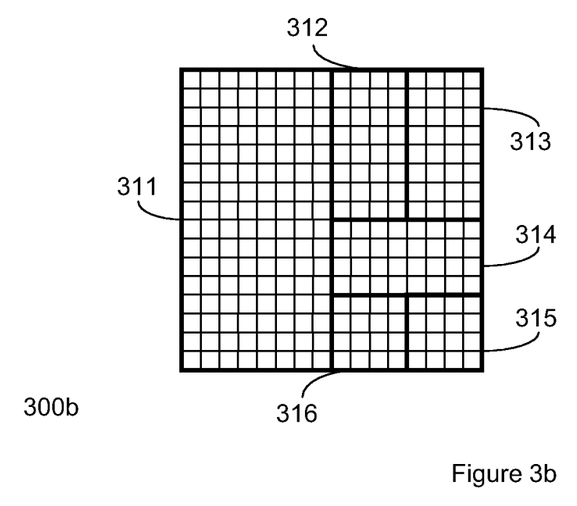
FIG. 3b is an illustration of a typical inter Macro Block that is divided into different inter partitions.

FIG. 3b shows a typical example of an inter MB 300b, which has been divided into one 16×8 partition 311, two 8×4 partitions 312,313, one 4×8 partition 314 and two 4×4 partitions 315,316, during encoding.

The encoder can choose to skip a MB if the MB is very similar to a corresponding MB in a previous picture, or when the available number of bits is considered to be too low to afford to encode the MB.

For a motion vector, H.264 defines three resolutions, namely the integer pixel, half pixel, and quarter pixel resolution. The integer pixel resolution is the most simple resolution to handle for the encoder/decoder, while in order to be able to handle half pixel and quarter pixel resolution, interpolations between adjacent pixels must be performed on present reference data. To perform half pixel interpolation a six tap FIR filter is typically used, while a bilinear interpolation is performed on the half pixels for the quarter pixel.

The encoder has to determine which precision to use for each inter block, based on criteria, such as e.g. one or more of the criteria mentioned above. For every new tested half or quarter pixel resolution motion vector the encoder must perform an interpolation which is processing consuming, especially for MBs having different partition sizes due to large variations between different parts of a picture.

The computational complexity may therefore be decreased both on the encoder, as well as on the decoder side, e.g. by choosing to use only integer pixel resolution at the encoder.

Since it is possible to use several reference frames in a video bit stream, also such a decision can have impact on the encoding and decoding computational power.

On the encoder side this can result in an increased amount of reference data that has to be tested, which will finally result in an increased demand for computational power.

On the decoder side, the use of several reference frames may decrease the computational power that is left for performing the decoding, since reference data may have to be fetched from different parts of the memory, several times in the same frame. Also in this particular situation, the encoder must decide on the number of reference frames to use. Also here such a decision may be based on different issues, such as e.g. the number of bits to use, the difficulty of encoding the current area with good quality, and also the time and processing power available to the encoder.

Consequently, there are a number of ways of obtaining an indication of the level of complexity that was at the encoding step. By extracting certain predefined parameters from an encoded bit stream and by processing these parameters accordingly, typically by using a conventional data extracting measures, it will, subsequent to the encoding, be possible to obtain information about the complexity used by the encoder at the bit stream source. By defining complexity levels, which are then used during the evaluation of the extracted parameters, a measure of the required complexity level may give an even more predictable indication of the complexity.

By way of example, the following parameters may have been extracted from an encoded bit stream in association with decoding the encoded bit stream at a decoding device, or in association with processing the encoded bit stream at a network node:

P1=ratio of intra 16×16 partitions
P2=ratio of intra 8×8 partitions
P3=ratio of intra 4×4 partitions
P4=ratio of inter 16×16 partitions
P5=ratio of inter 16×8 partitions
P6=ratio of inter 8×16 partitions
P7=ratio of inter 8×8 partitions
P8=ratio of inter 4×8 partitions
P9=ratio of inter 8×4 partitions
P10=ratio of inter 4×4 partitions
P11=number of Reference pictures (nbrRef)
P12=motion vector resolution representation (MVres), where e.g. MVres may be set to 1 if integer pixel resolution is used, to 2 if half pixel resolution is
P13=Average Quantiser Paranmeter (AQP)
P14=Average FrameRate (AFR)

The extracted parameters exemplified above may be used in a linear quality model, such as e.g. the following bit stream quality model, here referred to as a PredictedQualityScore (PQS) model:

$$PQS = a_0 + a_2 \times P1 + a_2 \times P_2 + a_3 \times P_3 + a_4 \times P_4 + a_5 \times P_5 + a_6 \times P_6 + a_7 \times P_7 + a_8 \times P_8 + a_9 \times P_9 + a_{10} \times 10 + a_{11} \times P_{11} + a_{12} \times P_{12} + a_{13} \times P_{13} + a_{14} \times P_{14} \quad (1)$$

Alternatively, the extracted parameters may be used in a non-linear PQS model, such as e.g. according to the following model:

$$PQS = a_0 + a_1 \times P_1^{b_1} + a_2 \times P_2^{b_2} + a_3 \times P_3^{b_3} + \ldots \quad (2)$$

Where $a_0, a_1 \ldots$ and $b_1, b_2 \ldots$ are bit stream quality model specific coefficients which may have been pre-selected, e.g. by way of training the bit stream quality model, or PQS model, on subjective test data, or chosen based on complexity level. In the present example P13 and P14 are quality parameters that are used in addition to the complexity related parameters P1-P12. Based on the calculation of a linear or non-linear quality model, a bit stream quality score may then be derived.

If instead pre-defined complexity levels are applied, a predefined combination of a set of extracted parameters may typically be compared to two or more pre-defined complexity levels, which may be defined e.g. as threshold values.

The mere existence of one specific type of partitions during encoding may be an indication to a decoding device or a network node on which a bit stream quality score is required, that an encoding of high complexity has been used at the bit stream source.

If e.g. it is found at the decoding device that intra 4×4 partitions have been used during encoding at the bit stream source, i.e. P3 is extracted at the decoding device, and has a value other than 0, this may be an indication that a high complexity level, e.g. complexity level 4 on a 1 to 4 scale, should be chosen, while if P3 equals 0, a complexity level lower that 4 should instead be chosen, typically on the basis of one or more parameter other than P3. Other Rules for how a complexity level is to depend on one or more parameters may be pre-defined according to a number of possible combinations.

If the extracted information is to be used for adapting a decoding sub-system, the parameters may be used directly as input parameters, or indirectly, by first comparing a certain combination of one or more parameters to a set of pre-defined complexity levels, in a similar manner as indicated above. Based on the result certain acceleration blocks of the decoder may be turned off in order to save power, and/or some memory blocks may be released in order to save allocated memory space.

Adaptation of the decoder-sub-system may also comprise the step of preparing the sub-system, according to complexity related information. If e.g. it is determined from the extracted information that half-pixel resolution is used, interpolation will be required at the decoder, and, thus, a sub-module of the decoder that is configured for this particular task may be activated, when adapting the decoder sub-system.

It is to be understood that, although H.264 has been used above to exemplify problems that may appear during encoding/decoding, the solution suggested in this document is in no way limited only to H.264, but may be deployed also for other similar types of video codecs, such as e.g. H.261, H.263, MPEG-2 and MPEG-4. Even though the partition sizes and motion vector resolutions used during encoding may not be the same for other codecs, the principles remain the same.

It is also to be understood that other types of complexity related information than what has been presented above may be extracted from a video bit stream, or any other multimedia bit stream, and processed, in accordance with any of the embodiments described above.

An exemplary arrangement that is configured to provide a bit stream quality score by using a bit stream quality model and one or more parameters that is/are indicative of the complexity of the encoder as an input to the quality model will now be described with reference to FIG. 4.

Figure 4:
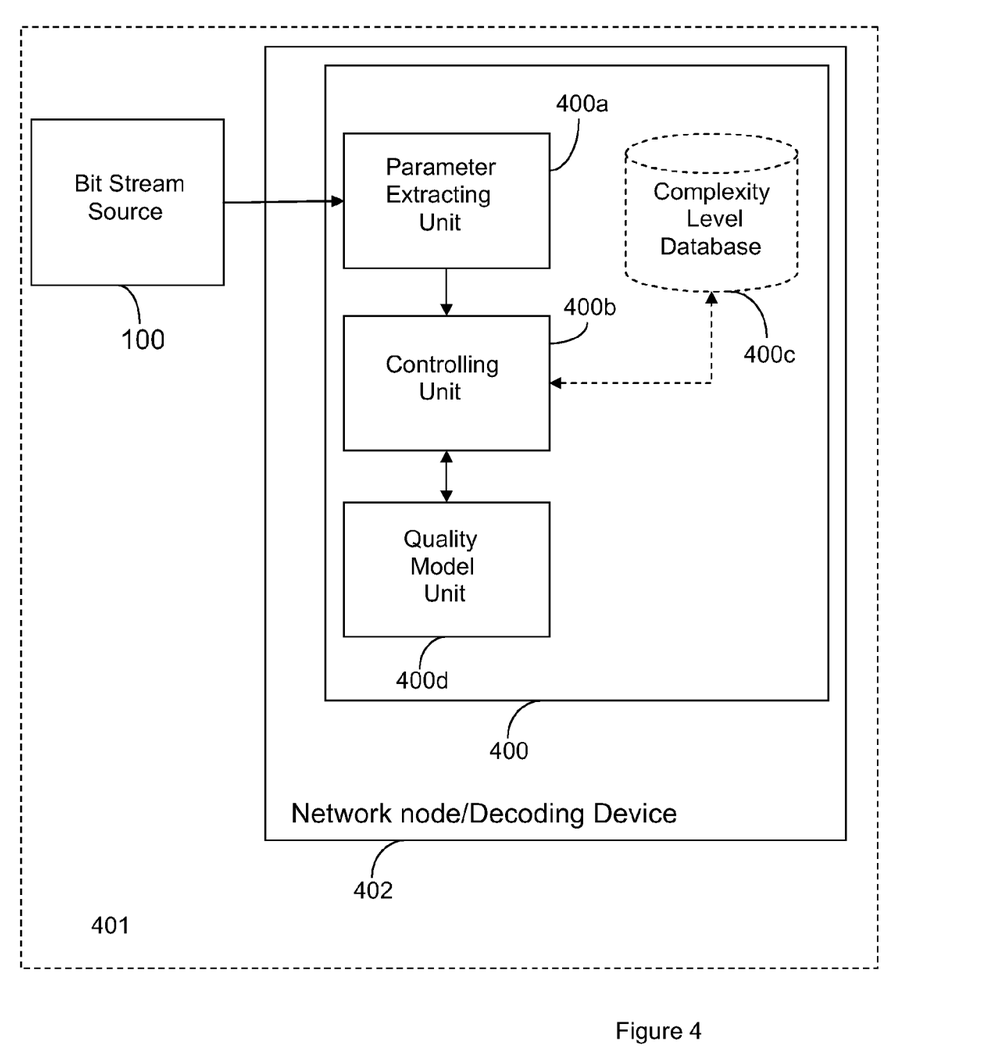
FIG. 4 is a schematic illustration of an arrangement configured to extract and use complexity related information for deriving a bit stream quality score, according to one exemplary embodiment.

FIG. 4 is an illustration of an exemplified arrangement 400, which in the present context may be referred to e.g. as a Media quality monitoring device, which is receiving an encoded bit stream, such as e.g. a video bit stream, from a bit stream source 100. Together with arrangement 400, bit stream source 100 forms a multimedia system 401 where, according to the figure direct access is provided between the two units. As previously indicated in FIGS. 1a and 1b, it is to be understood that, a bit stream may be distributed directly from the bit stream source 401 to arrangement 400, as indicated in the figure, or via any type of conventional communications network.

The arrangement 400, which may be part of a rendering device, comprising decoding functionality, or a network node, in the figure referred to as network node/decoding device 402, that is configured to derive a representative bit stream quality score for a received bit stream, comprises a unit, here referred to as a parameter extracting unit 400a, that is configured to extract information in the form of one or more predefined parameters that, to at least some extend, is indicative of the complexity used during encoding at the bit stream source 100, or in other words, the extracted information gives an indication of the complexity level used during the encoding, that can be interpreted during subsequent decoding or processing of the encoded bit stream. The apparatus 400 also comprises another unit, here referred to as a controlling unit 400b, that is configured to select data settings for a bit stream quality model from a plurality of possible data settings that are pre-defined for a bit stream quality model. A bit stream quality score that is representative of the received bit stream is then calculated on the basis of the selected data settings. This is typically achieved by the controlling unit 400b, assuring that the selected data settings are used for a pre-defined quality model that is used for calculating the required bit stream quality score. Such a calculating procedure may, according to the exemplified configuration, be executed at a separate unit, such as the quality model unit 400d of FIG. 1.

According to one embodiment, the controlling unit 400b may be configured to determine one or more appropriate data settings, using the one or more extracted parameters as a direct input to this decision. Alternatively the controlling unit 400b may be configured to base such a decision on a comparison between the extracted information and a set of pre-defined complexity levels, that are typically obtained from a database, here referred to as a complexity level database 400c.

Instead of basing its decision only on complexity related parameters, the controlling unit 400b may be configured to consider also other information that is extractable from a received video bit stream, such as e.g. a quantizer parameter, the frame rate, the bit rate, and/or one or more other quality related parameters. In the latter case, parameter extracting unit 400a may be configured to extract also this additional type of parameters. Alternatively, such parameters may be extracted from a separate parameter extracting unit (not shown).

Consequently the controlling unit 400b is configured to select one or more data settings as a function of the one or more extracted parameters, and these data settings will be used as a data input for a bit stream quality model, executed at the quality model unit 400d. Once derived, the resulting bit stream quality score may be forwarded from the quality model unit 400d, or retrievable by a QoE Server, or any other type of entity that may require a bit stream quality score for an encoded bit stream.

Alternatively, the bit stream quality score may be monitored directly on the network node/decoding device, where it was measured in any type of conventional manner.

In addition to the described extracting functionality, as well as any other conventional functionality for making use of a retrieved bit stream quality score, arrangement 400 may also comprise other conventional functionality, such as e.g. decoding functionality and/or functionality for enabling conventional processing of a received encoded bit stream, such as e.g. for enabling displaying of a video, or routing of a video.

Since this type of optional functionality is not essential for the understanding of the suggested extracting mechanism, such additional functionality will not be described any further for the present apparatus.

As already indicated above, the suggested parameter extracting method may, according to an alternative embodiment, be used for the purpose of adapting the decoding sub-system of a decoding device, so as to strive for an optimization of the decoding procedure, as to the use of resources of the decoding sub-system.

Such an adaptation or optimization procedure may be configured in different alternative ways. According to a first embodiment, an encoded bit stream may be parsed before the decoding is started. Such a configuration will, however, require buffering of the bit stream, and, thus, when such a procedure is applied, an optimized displaying of multimedia content provided via the encoded bit stream will be delayed.

Figure 5:
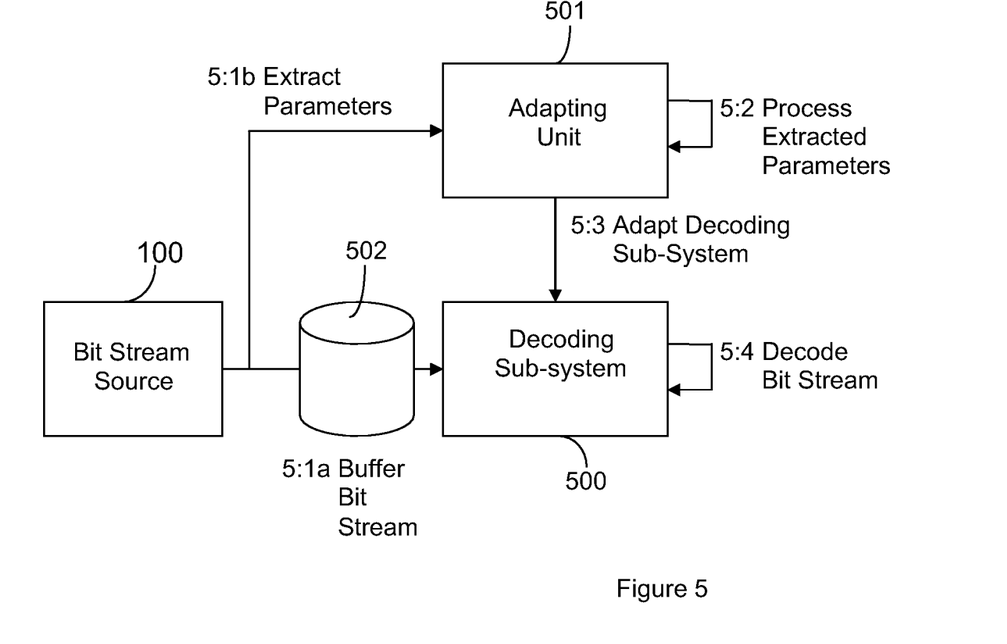
FIG. 5 is a schematic scenario illustrating how parameters may be extracted from an encoded bit stream, and used for adapting a decoding sub-system, according to one embodiment.

These separate procedures are schematically illustrated with steps 5:1a and 5:1b, respectively.

FIG. 5 is an illustration of such an adaptation/optimization mechanism. As can be seen in the figure, an encoded bit stream provided from a bit stream source 401 to a decoding sub-system 500 is first buffered by a buffer 502, while in the same time one or more encoding complexity related parameters are extracted from the encoded bit stream by an adapting unit 501.

The extracted parameters are processed by an adapting unit 501, as indicated with another step 5:2. This processing step comprises the step of selecting one or more data settings, either directly as a function of the one or more extracted parameters, or indirectly, i.e. after the extracted information has been compared to a set of pre-defined complexity levels. On the basis of the data settings, the decoding sub-system 500, is then adapted, such that the use of one or more category of scarce resources, or other selectable functions of the decoding sub-system can be adapted. Such an adaptation step is indicated with a step 5:3. Once adapted, content from the encoded bit stream can now be decoded in a decoding process where different parts of the decoding sub-system 500 are used in a more efficient way, as indicated with a step 5:4.

According to another, alternative embodiment, which will now be described with reference to FIG. 6, a decoding sub-system 600 starts to decode a received encoded bit stream by decoding, according to conventional procedures, i.e. without initially being able to adapt the decoding procedure.

In a first step 6:1, an encoded bit stream is received from a bit stream source 401. Once received by the decoding sub-system 600, the encoded bit stream is decoded, using any conventional decoding technique, as indicated with a processing step 6:2a. In the same time an adapting unit 601 is extracting one or more pre-defined complexity related parameters from the received bit stream, as indicate with another step 6:2b. The adapting unit 601 processes the extracted parameters in accordance with corresponding processing step 5:2 of FIG. 5. This is indicated with another processing step 6:3 in FIG. 6.

Once processed, appropriate data settings will be used as an input to the decoding sub-system 600, which is then adapted according to pre-defined rules. This is indicated with a step 6:4. As indicated with a final step 6:5, the decoding procedure will now be executed according to the adaptations, executed in step 6:4.

It is to be understood that the adaptations described according to any of the embodiments suggested above may be executed during a limited time interval, or repeated on a continuous basis, thereby enabling the decoding sub-system to be continuously adapted.

Figure 6:
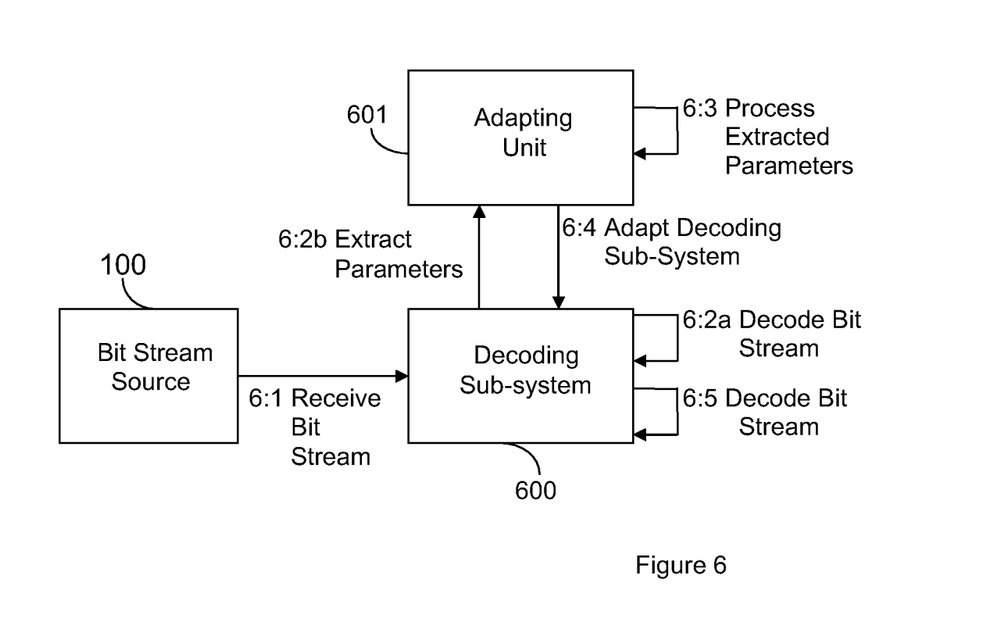
FIG. 6 is another schematic scenario illustrating how parameters may be extracted from an encoded bit stream and used for adapting a decoding sub-system, according to another embodiment.

It is also to be understood that the illustrative embodiments of FIGS. 5 and 6 are to be seen merely as schematic, simplified system overviews, where additional system entities and steps that are not necessary for the understanding of the suggested adapting mechanism have been omitted.

By way of example, an encoded bit stream is typically provided to the decoding sub-system and adapting unit via a communications network. Typically, the decoding sub-system is also connected to rendering functionality, i.e. some kind of displaying means that is enabling displaying of the decoded video to an end user.

An exemplified arrangement that is configured to execute an adaptation of a decoding sub-system according to any of the embodiments described above with reference to FIGS. 5 and 6, will now be described in further detail with reference to FIG. 7.

Figure 7:
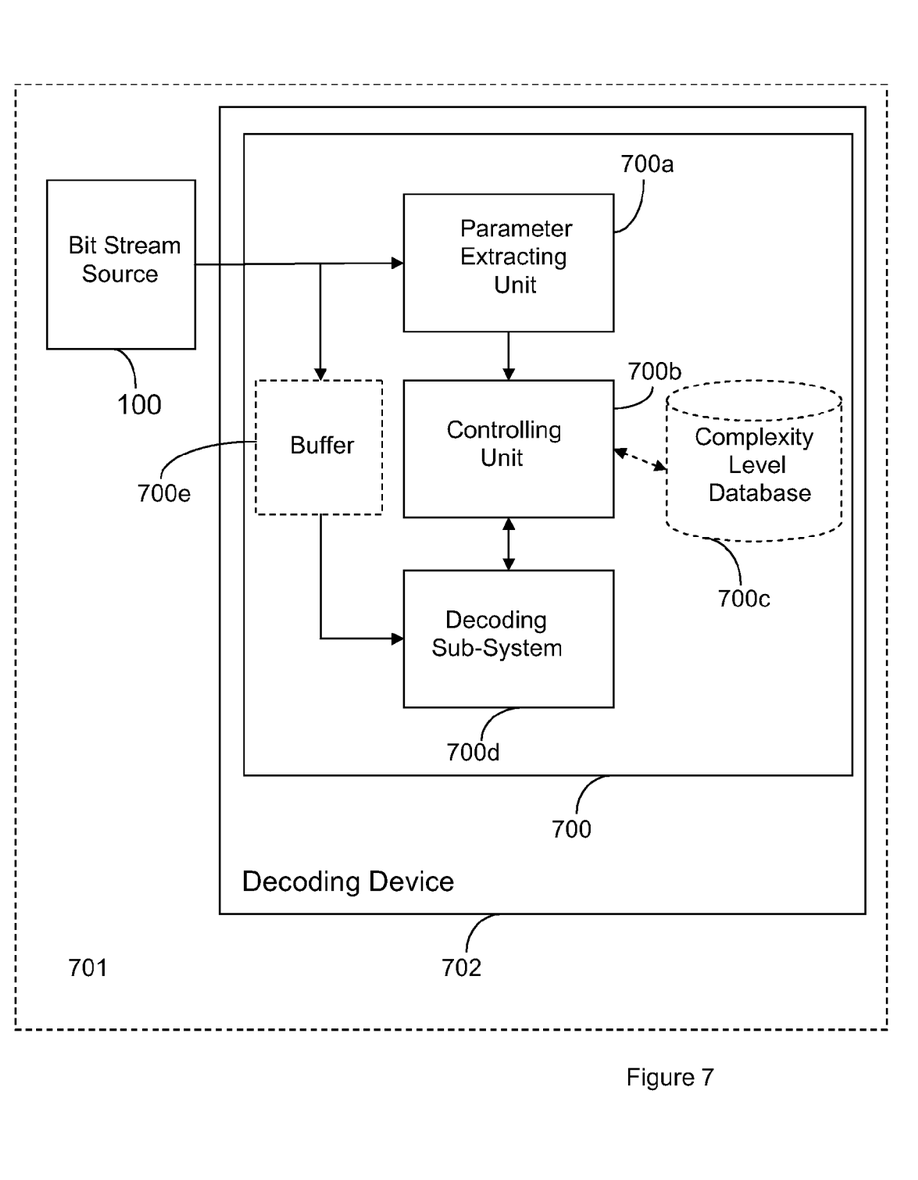
FIG. 7 is a schematic illustration of an arrangement configured to extract and use encoding complexity related information for adapting a decoding sub-system, according to one exemplary embodiment.

In resemblance to FIG. 4, FIG. 7 can be seen an arrangement 700 that is configured to receive and decode an encoded bit stream from a bit stream source 100, where the bit stream source 100, together with the arrangement 700 form a multimedia system 701, where these two entities may be either directly interconnected, as indicated in the figure, or via a network.

In resemblance to the arrangement of FIG. 4, it is also to be understood that only units that are necessary for the understanding of the respective apparatus have been included in the figure.

Arrangement 700 of FIG. 7, which is typically part of a decoding device 702, comprises a parameter extracting unit 700a, which typically may correspond to parameter extracting unit 400a of FIG. 4, i.e. a unit that is configured to parse an encoded bit stream, thereby enabling complexity related information in the form of one or more pre-defined parameters to be extracted from the encoded bit stream, or, in other words, to enable information that is indicative of the complexity used during encoding of the encoded bit stream to be extracted. By processing this extracted information accordingly, it will be possible to make use of information about the complexity used at the preceding encoding process.

Arrangement 700 also comprises a controlling unit 700b, that is configured to select one or more data settings, according to extracted information obtained from the parameter extracting unit 700a. Parameter extracting unit 700a and controlling unit 700b together form the adapting unit 501, 601 of FIGS. 5 and 6, respectively. The data settings may be selected according to rules that depend on one or more extracted parameters, or as a result of a comparison with a set of pre-defined complexity levels, that may typically be accessible from a database, here referred to as complexity level database 700c.

If apparatus 700 is configured to execute the method according to the first embodiment mentioned above, with reference to FIG. 5, it also comprises a buffer 700e that is configured to buffer the encoded bit stream parallel to extracting information from the encoded bit stream.

If arrangement 700 is instead to be used with the method according to the second embodiment, referred to above with reference to FIG. 6, the decoding sub-system 700d will be receiving the encoded bit stream provided from bit stream source 401 simultaneously with the controlling unit 700b being configured to receive and process complexity related information, extracted from the video bit stream, by the parameter extracting unit 700a.

While the invention has been described with reference to specific exemplary embodiments, the description is generally only intended to illustrate the inventive concept and should not be taken as limiting the scope of the invention, which is defined by the appended claims.

More specifically, it is e.g. to be understood that the suggested arrangement of FIG. 4, as well as the arrangement described above with reference to FIG. 7, only represent simplified, illustrative examples of how a device or network node may be configured in order to be able to extract complexity related information from an encoded bit stream, and to use such information according to any of the described embodiments, and that functional entities that may be commonly used in this type of context, but that are not necessary for the understanding of the extracting mechanism which is the scope of this documents have been omitted in the respective figures for simplicity reasons.

ABBREVIATIONS LIST

| | |
|---|---|
| DVB-H | Digital Video Broadcast |
| DVB-T | Digital Video Broadcast Terrestrial |
| DVB-C | Digital Video Broadcast |
| DVB-S | Digital Video Broadcast |
| FR | Full Reference |
| MB | Macro Block |
| MBMS | Multimedia Broadcast Multicast Service |
| MOS | Mean Opinion Score |
| NR | Noise Reference |
| PEVQ | Perceptual Evaluation of Video Quality |
| PSNR | Peak Signal to Noise Ration |
| QoE | Quality of Experience |
| RR | Reduced Reference |
| VQEG | Video Quality Experts Group |

The invention claimed is:

1. A method in a decoding device of adapting a decoding sub-system, said method comprising the steps of:
   receiving an encoded bit stream from a bit stream source;
   extracting complexity related information from said encoded bit stream, the complexity related information being indicative of the complexity of the encoding of said bit stream source;
   comparing said extracted information to a set of pre-defined complexity levels;
   selecting at least one data setting on the basis of said comparison; and
   adapting said decoding sub-system in response to said selected at least one data setting.

2. A method according to claim 1, wherein said extracting step is executed by parsing at least a part of said encoded bit stream.

3. A method according to claim 2, wherein said at least part of said bit stream is parsed before starting to decode said bit stream at said decoding sub-system.

4. A method according to claim 1, wherein said extracting step is executed during decoding of said bit steam.

5. A method according to claim 1, wherein said adapting step comprises adapting the distribution of computational power, co-processors or acceleration blocks within said decoding sub-system.

6. An arrangement for adapting a bit stream decoding sub-system in a multimedia system, said arrangement comprising:
at least one processor;
at least one memory coupled to the at least one processor and comprising computer readable program code that when executed by the at least one processor causes the at least one processor to perform operations comprising:
extracting complexity related information from an encoded bit stream received from a bit stream source, said complexity related information being indicative of the complexity of the encoding at said bit stream source, and
selecting at least one data setting of said decoding sub-system on the basis of said extracted complexity related information, wherein said controlling unit is further configured to compare said extracted information to a set of pre-defined complexity levels, and
selecting said one or more data settings on the basis of said comparison, and to adapt said decoding sub-system in response to said selected at least one data setting.

7. An arrangement according to claim 6, wherein the at least one processor is further configured to extract said complexity related information by parsing at least a part of said bit stream.

8. An arrangement according to claim 6, wherein said arrangement further comprises a buffer, which is configured to buffer said bit stream simultaneously with extracting complexity related information from said bit stream.

9. An arrangement according to claim 8, wherein the at least one processor is further configured to initiate decoding of said encoded bit stream at said decoding sub-system in response to when at least a part of said encoded bit stream has been buffered.

* * * * *

UNITED STATES PATENT AND TRADEMARK OFFICE
CERTIFICATE OF CORRECTION

| | | |
|---|---|---|
| PATENT NO. | : 9,462,233 B2 | Page 1 of 1 |
| APPLICATION NO. | : 13/201619 | |
| DATED | : October 4, 2016 | |
| INVENTOR(S) | : Rossholm et al. | |

It is certified that error appears in the above-identified patent and that said Letters Patent is hereby corrected as shown below:

On the Title Page

Item (74), under "Attorney, Agent, or Firm", in Column 2, Line 1, delete "Myers Bigel & Sibley, P.A." and insert -- Myers Bigel Sajovec & Sibley, P.A. --, therefor.

In the Specification

Column 6, Line 32, delete "decoding device 100" and insert -- decoding device 101 --, therefor.

Column 6, Lines 33-34, delete "decoding device 100," and insert -- decoding device 101, --, therefor.

Column 14, Line 34, delete "Broadcast" and insert -- Broadcast Handheld --, therefor.

Column 14, Line 36, delete "Broadcast" and insert -- Broadcast Cable --, therefor.

Column 14, Line 37, delete "Broadcast" and insert -- Broadcast Satellite --, therefor.

Column 14, Line 42, delete "Ration" and insert -- Ratio --, therefor.

Signed and Sealed this
Fourteenth Day of November, 2017

Joseph Matal
*Performing the Functions and Duties of the
Under Secretary of Commerce for Intellectual Property and
Director of the United States Patent and Trademark Office*